US011356347B2

(12) United States Patent
Wang

(10) Patent No.: US 11,356,347 B2
(45) Date of Patent: Jun. 7, 2022

(54) METHOD AND APPARATUS FOR MONITORING PERFORMANCE OF VIRTUALIZED NETWORK FUNCTIONS

(71) Applicant: Alcatel Lucent, Nozay (FR)

(72) Inventor: Cheng Wang, Shanghai (CN)

(73) Assignee: Alcatel Lucent, Nozay (FR)

( * ) Notice: Subject to any disclaimer, the term of this patent is extended or adjusted under 35 U.S.C. 154(b) by 42 days.

(21) Appl. No.: 16/623,215

(22) PCT Filed: Jul. 10, 2018

(86) PCT No.: PCT/IB2018/000922
§ 371 (c)(1),
(2) Date: Dec. 16, 2019

(87) PCT Pub. No.: WO2019/012333
PCT Pub. Date: Jan. 17, 2019

(65) Prior Publication Data
US 2021/0152449 A1 May 20, 2021

(30) Foreign Application Priority Data
Jul. 12, 2017 (CN) .......................... 201710567409.5

(51) Int. Cl.
*H04L 43/0817* (2022.01)
*G06F 9/455* (2018.01)
*H04L 41/0896* (2022.01)
*H04L 41/5025* (2022.01)
*H04L 43/0852* (2022.01)
*H04L 43/106* (2022.01)

(52) U.S. Cl.
CPC ...... *H04L 43/0817* (2013.01); *G06F 9/45558* (2013.01); *H04L 41/0896* (2013.01); *H04L 41/5025* (2013.01); *H04L 43/0852* (2013.01); *H04L 43/106* (2013.01); *G06F 2009/45595* (2013.01)

(58) Field of Classification Search
CPC .............. H04L 43/106; H04L 43/0817; H04L 43/0852; H04L 41/0896; H04L 41/5025; G06F 9/45558; G06F 2009/45595
See application file for complete search history.

(56) References Cited
U.S. PATENT DOCUMENTS 10,785,109 B1 * 9/2020 Sidebottom ............. H04L 67/16
2016/0373474 A1 * 12/2016 Sood ....................... G06F 21/50
(Continued)

FOREIGN PATENT DOCUMENTS

| CN | 105103125 A | 11/2015 |
|---|---|---|
| CN | 106533723 A | 3/2017 |

(Continued)

OTHER PUBLICATIONS

Office Action dated Mar. 4, 2020, issued in corresponding Chinese Patent Application No. 201710567409.5.
(Continued)

*Primary Examiner* — Azizul Choudhury
(74) *Attorney, Agent, or Firm* — Harness, Dickey & Pierce, P.L.C.

(57) ABSTRACT

The method includes obtaining latency-related data of a VNF for performance monitoring; and evaluating performance of the VNF based on the latency-related data.

17 Claims, 2 Drawing Sheets

(56) References Cited

U.S. PATENT DOCUMENTS

| | | | |
|---|---|---|---|
| 2017/0094377 A1 | 3/2017 | Herdrich et al. | |
| 2017/0104608 A1* | 4/2017 | Sergeev | H04L 12/4641 |
| 2017/0171871 A1 | 6/2017 | Ryan et al. | |
| 2017/0293500 A1* | 10/2017 | Molina | G06F 9/45558 |
| 2018/0088977 A1* | 3/2018 | Gray | H04L 41/0896 |
| 2018/0173547 A1* | 6/2018 | Stokes | G06F 9/45558 |
| 2018/0285563 A1* | 10/2018 | Browne | G06F 21/53 |
| 2019/0372939 A1* | 12/2019 | Kalliola | H04L 63/14 |

FOREIGN PATENT DOCUMENTS

| | | |
|---|---|---|
| CN | 106533724 A | 3/2017 |
| CN | 106537842 A | 3/2017 |
| JP | 2017050715 A | 3/2017 |
| WO | WO-2015126430 A1 | 8/2015 |
| WO | WO-2016204804 A1 | 12/2016 |

OTHER PUBLICATIONS

"Network Functions Virtualisation (NFV); Management and Orchestration", Group Specification, European Telecommunications Standards Institute (ETSI), 650, Route Des Lucioles ; F-06921 Sophia-Antipolis ; FRANCE,vol. NFV MAN, No. V1.1.1, Dec. 1, 2014 (Dec. 1, 2014), XP014235740, Sections 4.1-4.3 and 6.3.1.2.
International Search Report PCT/ISA/210 for International Application No. PCT/IB2018/000922 dated Oct. 12, 2018.
Communication pursuant to Article 94(3) EPC dated May 3, 2021 in European Application No. 18 762 133.9.
Office Action for Chinese Application No. 201710567409.5 dated Jul. 27, 2020 and English translation.

* cited by examiner

METHOD AND APPARATUS FOR MONITORING PERFORMANCE OF VIRTUALIZED NETWORK FUNCTIONS

CROSS-REFERENCE TO RELATED APPLICATIONS

This application is a national phase under 35 U.S.C. § 371 of PCT International Application No. PCT/IB2018/000922 which has an International filing date of Jul. 10, 2018, which claims priority to Chinese Patent Application No. 201710567409.5, filed Jul. 12, 2017, the entire contents of each of which are hereby incorporated by reference.

FIELD

Embodiments of the present disclosure generally relate to the field of communication technologies, and more particularly to a method and apparatus for monitoring performance of virtualized network functions (VNF).

BACKGROUND

The underlying idea of cloud RAN (Cloud Radio Access Network) and Network Functions Virtualization (NFV) is to use a general-purpose processor (GPP) to do RAN and CN processing as much as possible. This can exploit the economies of scale of the IT industry and leverage standard IT virtualization technology to consolidate many network equipment types onto industry standard high-volume servers (for example x86 architecture), switches and storage. With the support of NFV, multiple mobile network functions may be decoupled from hardware, which speeds new service deployment and achieves resource sharing among different services.

Centralized RAN processing can easily realize data exchange between eNBs, and multiple eNBs can cooperate to eliminate interference and achieve performance gain. The RAN processing in cloud can also bring a pooling gain. With cloud infrastructure, all the eNBs are located in the same BBU pool, which facilitates processing power sharing among the eNBs, thereby allowing an operator to either reduce costs by provisioning fewer compute resources or reduce power consumption by turning the idle processors off.

Existing Cloud RAN faces the following challenges:

1) Real-time tasks in RAN processing: RAN processing is a time stringent task which expects some kind of response within a period of time or some operations must be finished within several TTIs. For example, if LTE downlink data on the PDSCH is received by the terminal in subframe n, the terminal must transmit the HARQ acknowledgment in uplink subframe n+4. Another example is MAC scheduling, the scheduler must complete the scheduling within each TTI which is an interval of one millisecond. For 5G, TTI will be shorten greatly.

2) The processing capability of GPP: In recent years GPP has progressed rapidly. New features such as multi-CPU/multi-core, Single-Instruction Multiple Data (SIMD) and large on-chip caches make it possible to afford multiple wireless stacks on a single GPP server. For example, one x86 CPU core can handle three cells' L2 processing (400 active users in each cell). Thus, one x86 server with multiple CPU cores can support multiple cells' wireless stacks which may include L2, L3 processing and some functions of L1. For L3 processing, the real-time constraint is looser than L2/L1 and its processing load is very low which means more L3 virtual network functions (VNF) can be afforded by a single CPU core.

3) Orchestration of real-time VNF: one CPU core can afford multiple virtual VNFs. When a VNF is instantiated, the orchestrator should determine on which machine the VNF will be placed. Some orchestrators have been developed to deploy cloud applications. However, all of the above VNFs are non-real time services. That is, the traditional orchestrators only focus on the allocation of computing resources to VNFs. They don't care real-time performance of the service very much.

In the case where real-time VNFs are deployed in cloud environments, a new type of orchestrators that support deployment of real-time VNFs is required. Based on our test, I/O operations can impact real-time performance greatly. If the network adapter I/O interrupt thread shares the same CPU core with a real-time application, the real-time performance of the application can be degraded seriously. If the network adapter shares the CPU core with other critical real-time processes, the network throughput will be reduced.

In view of the above, there is no orchestrator for real-time VNF orchestration in the prior art. In order to achieve RAN processing in cloud infrastructure and meet the real-time constraints, a mechanism is needed to monitor real-time performance of VNFs which share a same CPU core.

SUMMARY

An object of the present disclosure is to provide a method and apparatus for monitoring performance of Virtualized Network Functions (VNF).

According to one aspect of the present disclosure, there is provided a method for monitoring performance of Virtualized Network Functions (VNF) in a virtual machine, wherein the virtual machine is assigned with one or more CPU cores, each CPU core supporting concurrent running of multiple VNFs, the method comprising steps of:
  a. obtaining latency-related data of a VNF that needs performance monitoring;
  b. evaluating performance of the VNF based on the latency-related data.

According to one aspect of the present disclosure, there is provided a performance monitoring apparatus for monitoring performance of Virtualized Network Functions (VNF) in a virtual machine, wherein the virtual machine is assigned with one or more CPU cores, each CPU core supporting concurrent running of multiple VNFs, the performance monitoring apparatus comprising steps of:
  a. a data obtaining module configured for obtaining latency-related data of a VNF that needs performance monitoring;
  b. a performance evaluating module configured for evaluating performance of the VNF based on the latency-related data.

According to one aspect of the present disclosure, there is further provided a network functions virtualization orchestrator, the network functions virtualization orchestrator comprising the performance monitoring apparatus according to the present disclosure.

Compared with the prior art, the present disclosure has the following advantages: capable of satisfying a requirement of monitoring the real-time performance of VNFs by monitoring real-time performance of relevant VNFs; providing a network functions virtualization orchestrator for RAN processing in a cloud system. Besides, the solutions according to the present disclosure may evaluate the real-time performance of the VNFs, which facilitates follow-up decisions based on the evaluated performance, e.g., determining whether a new VNF may be added to a certain CPU core.

BRIEF DESCRIPTION OF THE DRAWINGS

Other features, objectives, and advantages of the present disclosure will become more apparent through reading the detailed description of the non-limiting embodiments with reference to the drawings below.

In the drawings, like or similar reference numerals represent like or similar components.

DETAILED DESCRIPTION OF EMBODIMENTS

Figure 1:
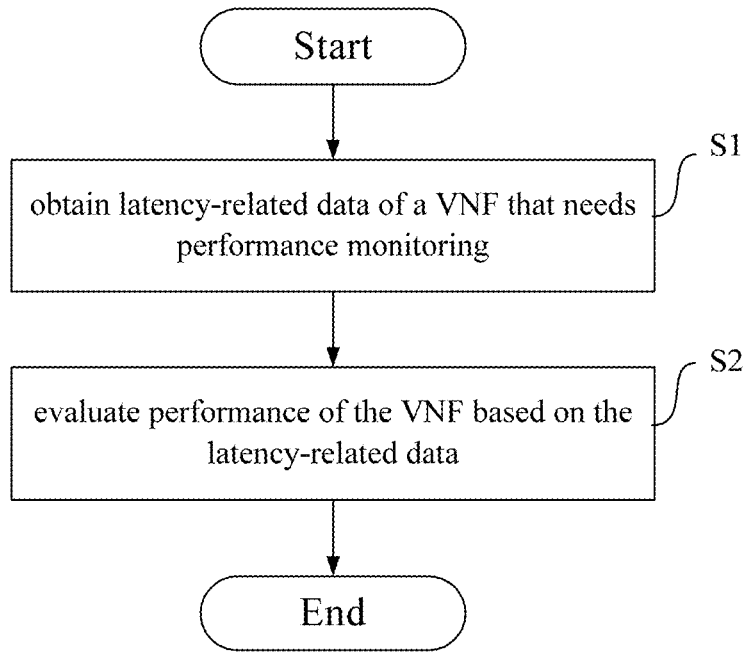
FIG. 1 schematically shows a flow diagram of a method for monitoring performance of VNFs according to the present disclosure.

Hereinafter, the present disclosure will be described in further detail with reference to the accompanying drawings:

FIG. 1 schematically shows a flow diagram of a method for monitoring performance of VNFs. The method according to the present disclosure comprises step S1 and step S2.

Particularly, the method according to the present disclosure is implemented by a performance monitoring apparatus included in a virtual machine.

Particularly, the virtual machine includes a VMware virtual machine, a KVM virtual machine, or a Linux container, or various other types of virtual machines. The types of virtual machines are not limited herein.

Particularly, the virtual machine is assigned with one or more CPU cores, each CPU core supporting concurrent running of multiple VNFs.

Figure 3A:
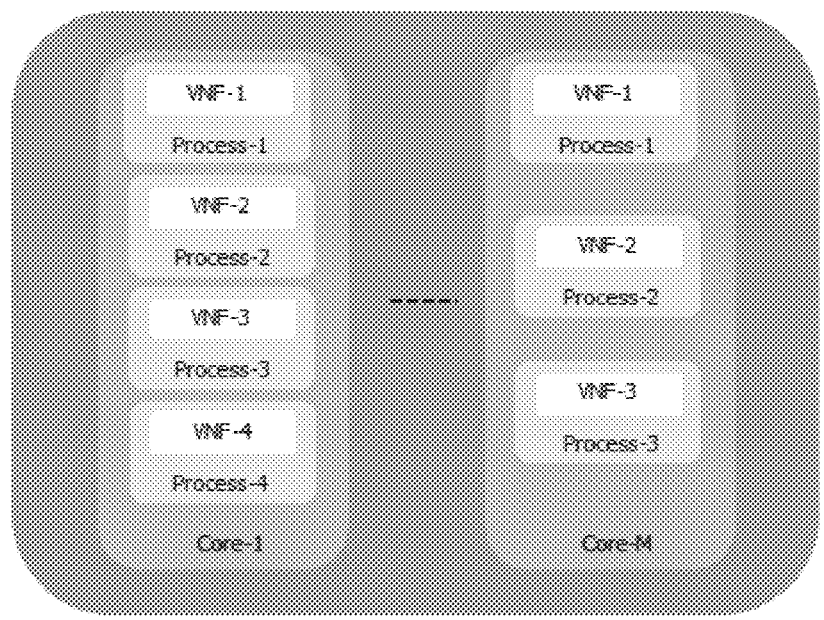
FIG. 3a schematically shows a diagram of a mechanism of sharing a CPU core among VNFs according to a preferred embodiment of the present disclosure.
Figure 3B:
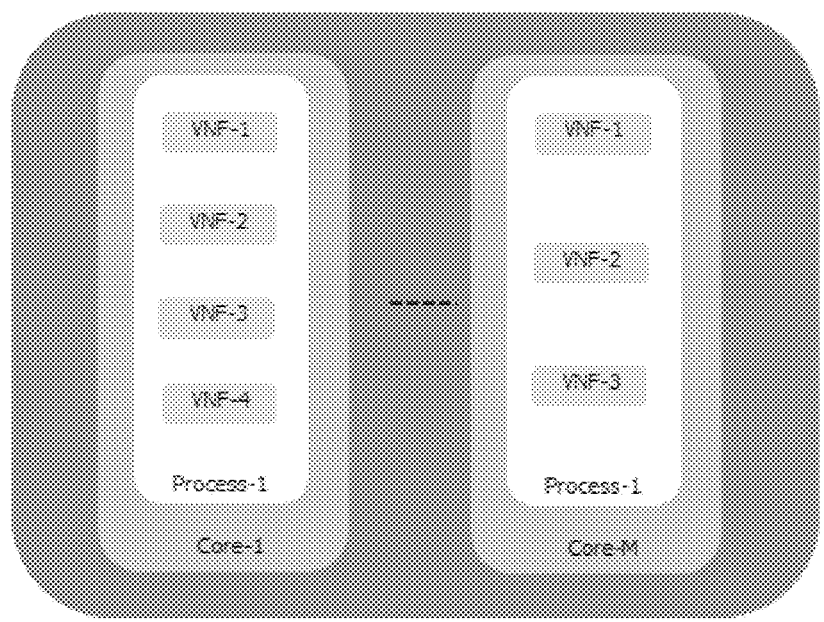
FIG. 3b schematically shows a diagram of sharing a CPU core among VNFs according to a preferred embodiment of the present disclosure.

Particularly, for multiple VNFs to share a CPU core, two mechanisms can be used:
1) One-process-per-VNF: as shown in FIG. 3a, in CPU cores from Core-1 to Core-M, each VNF has its own process, i.e., the OS can see multiple processes sharing the CPU core. In this case, it is the OS that determines which process to be executed after one process is hung up.
2) One-process-shared-by-multiple-VNFs. As shown in FIG. 3b, in the CPU cores from Core-1 to Core-M, one main process handles multiple VNFs.

Preferably, the performance monitoring apparatus according to the present disclosure is included in a Network functions virtualization orchestrator.

More preferably, the performance monitoring apparatus according to the present disclosure is included in a GPP (general propose processor).

Particularly, the network where the network devices are located include, but not limited to, the Internet, a wide area network, a metropolitan area network, a local area network, and a VPN network, etc.

It needs to be noted that, the network devices and the networks here are only examples, other existing or future possibly emerging UEs, network devices, and networks, if applicable to the present disclosure, should also be included in the protection scope of the present disclosure, which are incorporated here by reference.

Referring to FIG. 1, in step S1, the performance monitoring apparatus obtains latency-related data of VNFs that need performance monitoring.

Preferably, the VNFs that need performance monitoring refers to the VNFs that have real-time requirement.

Particularly, the latency-related data include at least any one of the following:
1) external interrupt latency: the external interrupt latency refers to an interval between the time when the external interrupt signal is sent and the time when the VNF begins running. Particularly, the external interrupt signal is sent by a peripheral component interconnect express (PCIe).
2) timer latency: the timer latency is defined as an interval between the time when the timer expires and the time when the timer event handler begins working.

When each VNF that needs performance monitoring corresponds to one process, the performance monitoring apparatus obtains its latency-related data in the respective process corresponding to each VNF by performing step S1.

Specifically, the performance monitoring apparatus exploits any one of the following manners to obtain latency-related data of VNFs that need performance monitoring.
1) when the latency-related data include the external interrupt latency, for each VNF that needs monitoring, the performance monitoring apparatus obtains the external interrupt latency of the VNF by the following steps:

When receiving the data from the PCIe device, the performance monitoring apparatus starts running the VNF; next, the performance monitoring apparatus obtains a first timestamp corresponding to sending of the interrupt signal and a second timestamp corresponding to starting running of the VNF; then, the performance monitoring apparatus calculates the corresponding interrupt latency based on the first timestamp and the second timestamp.

Particularly, the PCIe device includes various modules that may generate the interrupt signal.

For example, the PCIe device generates an interrupt signal after receiving the data; with $T_{exp}$ representing the first timestamp when the interrupt occurs, the PCIe device stores the timestamp in a register. An OS (Operating System) core invokes a corresponding interrupt processing procedure, and the interrupt processing program invokes a receive routine of the driver of the device to receive the data. At this point, the VNF program starts execution upon reading the data, and records, at the first time, a second timestamp ($T_{rep}$) corresponding to the current time. Then, the performance monitoring apparatus calculates an external interrupt latency $T_{latency}$ based on the following equation:

$$T_{latency}=T_{rep}-T_{exp} \tag{1}$$

2) the latency-related data include timer latency. For each VNF that needs monitoring, the performance monitoring apparatus obtains a timestamp when a timer event handler begins working; next, the performance monitoring apparatus calculates a timestamp when the timer expires based on a time line corresponding to an initial time and a predetermined time interval to obtain the corresponding timer latency.

For example, the predetermined timer interval is 1 ms. Because the exact time when the timer expires ($T_{exp}$) is unknown and only the timestamp ($T_{rep}$) when the timer event handler beginning working is measurable, a time baseline is first set at time instant 0; assuming time instant 0 $T_{exp\_0}=T_{rep\_0}$, then:

$$T_{exp\_1} = T_{exp\_0} + 1 \text{ ms} \quad (2)$$
$$T_{exp\_2} = T_{exp\_0} + 2 \text{ ms}$$
$$...$$
$$T_{exp\_n} = T_{exp\_0} + n \text{ ms}$$

Next, the timer latency $T_{latency}$ may be obtained by calculating the difference between $T_{rep}$ and $T_{exp}$.

For a scenario where multiple VNFs that need performance monitoring correspond to one process, the performance monitoring apparatus obtains the latency-related data of the multiple VNFs in the process corresponding to the multiple VNFs by performing step S1.

Particularly, the manner for the performance monitoring apparatus to obtain the latency-related data is similar to the above manner of obtaining the latency-related data in the circumstance where one VNF that needs performance monitoring corresponds to one process.

With timer latency measurement as an example, the time baseline is obtained when a code segment of the VNF is executed for the first time. If N VNFs share one CPU core, N baselines will be obtained. In the next timer loop, the timestamp ($T_{rep}$) when the timer event handler beginning working is obtained, and the time baseline is updated.

Preferably, to avoid mutual influence between time baselines of multiple VNFs, the performance monitoring apparatus treats the multiple VNFs as one entity and maintain only one time baseline, i.e., the time baseline is obtained at the very beginning of each process.

Continuing reference to FIG. 1, in step S2, the performance monitoring apparatus evaluates performance of the VNFs based on the latency-related data.

Specifically, the performance monitoring apparatus may evaluate the performance of the VNFs based on the latency-related data in accordance with a predetermined evaluation rule.

For example, based on a numerical range of the timer latency, the performance is evaluated into three levels: "good," "medium," and "poor," whereby the performance of the VNFs is evaluated.

Preferably, the performance monitoring apparatus generates performance indication information of the VNFs based on the latency-related data.

Particularly, the performance indication information may include various kinds of information for indicating performance.

Specifically, the performance monitoring apparatus may use the latency data per se as the performance indication information. Or, the performance monitoring apparatus may use performance level information corresponding to the latency data as the performance indication information.

Preferably, the performance monitoring apparatus sends the generated performance indication information of the VNFs to other devices.

According to a preferred embodiment of the present disclosure, when it is needed to add a new VNF to a CPU core, the VNFs that need monitoring include the new VNF and all other VNFs running in the CPU core, and the method comprises step S3 (not shown) after the steps S1 and S2.

In the step S3, the performance monitoring apparatus determines whether the new VNF may be added to the CPU core based on the latency related information of the new VNF and all other VNFs running in the CPU core.

Specifically, if the latency related information of the new VNF and all other VNFs running in the CPU core all satisfy a predetermined condition, the performance monitoring apparatus determines that the new VNF may be added to the CPU core.

For example, the conditions for the performance monitoring apparatus to determine whether a new VNF may be added to a certain CPU core include: external interrupt latencies/timer latencies of the new VNF and all other VNFs running in the CPU core are all smaller than a threshold f1, and there already exist 5 VNFs vnf1~vnf_5 concurrently running on the certain CPU core; now, it is to determine whether a new VNF vnf_6 may be added to the CPU core; then the performance monitoring apparatus obtains the respective external interrupt latency/timer latency of vnf_1~vnf_6 in step S1, and determines that they are all smaller than the threshold f1; then the performance monitoring apparatus determines that the vnf_6 may be added to the CPU core.

Compared with the prior art, the method according to the present disclosure has the following advantages: capable of satisfying a requirement of monitoring the real-time performance of VNFs by monitoring real-time performance of relevant VNFs; providing a network functions virtualization orchestrator for RAN processing in a cloud system. Besides, the solutions according to the present disclosure may evaluate the real-time performance of the VNFs, which facilitates follow-up decisions based on the evaluated performance, e.g., determining whether a new VNF may be added to a certain CPU core.

Figure 2:
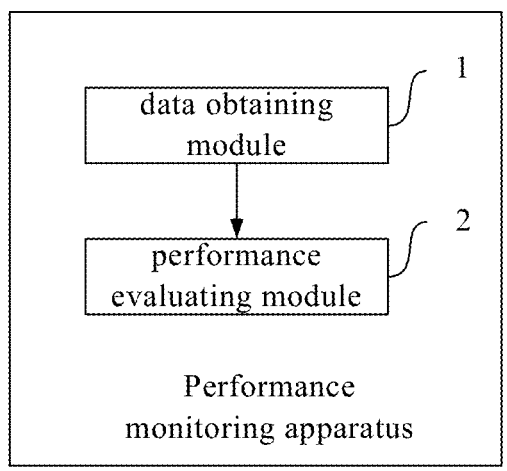
FIG. 2 schematically shows a structural diagram of a performance monitoring apparatus for monitoring performance of VNFs according to the present disclosure.

FIG. 2 schematically shows a structural diagram of a performance monitoring apparatus for monitoring performance of VNFs. The performance monitoring apparatus according to the present disclosure comprises a data obtaining module 1 and a performance evaluating module 2.

Referring to FIG. 2, the data obtaining module 1 obtains latency related data of the VNFs that need performance monitoring Preferably, the VNFs that need performance monitoring refer to the VNFs that have a real-time requirement.

Particularly, the latency-related data include at least any of the following:

1) external interrupt latency: the external interrupt latency refers to an interval between the time when the external interrupt signal is sent and the time when the VNF begins running. Particularly, the external interrupt signal is sent by a peripheral component interconnect express (PCIe).

2) timer latency: the timer latency is defined as an interval between the time when the timer expires and the time when the timer event handler begins working.

When each VNF that needs performance monitoring corresponds to one process, the data obtaining module 1 obtains its latency-related data in the respective process corresponding to each VNF.

Specifically, the data obtaining module 1 exploits any one of the following manners to obtain latency-related data of the VNFs that need performance monitoring:

1) when the latency-related data include the external interrupt latency, for each VNF that needs monitoring, the data obtaining module 1 obtains the external interrupt latency of the VNF by the following steps:

when receiving the data from the PCIe device, the data obtaining module 1 starts running the VNF; next, the data obtaining module 1 obtains a first timestamp corresponding to sending of the interrupt signal and a second timestamp corresponding to starting running of the VNF; then, the data obtaining module 1 calculates the corresponding interrupt latency based on the first timestamp and the second timestamp.

Particularly, the PCIe device includes various modules that may generate the interrupt signal.

2) the latency-related data include timer latency. For each VNF that needs monitoring, the data obtaining module 1 obtains a timestamp when a timer event handler begins working; next, the performance monitoring apparatus calculates a timestamp when the timer expires based on a time baseline corresponding to an initial time and a predetermined time interval to obtain the corresponding timer latency.

Next, the timer latency $T_{latency}$ may be obtained by calculating the difference between $T_{rep}$ and $T_{exp}$.

For a scenario where multiple VNFs that need performance monitoring correspond to one process, the data obtaining module 1 obtains the latency-related data of the multiple VNFs in the process corresponding to the multiple VNFs.

Particularly, the manner for the performance monitoring apparatus to obtain the latency-related data is similar to the above manner of obtaining the latency-related data in the circumstance where one VNF that needs performance monitoring corresponds to one process.

With timer latency measurement as an example, the time baseline is obtained when a code segment of the VNF is executed for the first time. If N VNFs share one CPU core, N baselines will be obtained. In the next timer loop, the runtime timestamp ($T_{rep}$) of the timer event handler is obtained, and the time baseline is updated.

Preferably, to avoid mutual influence between time baselines of multiple VNFs, the data obtaining module 1 treats the multiple VNFs as one entity and maintains only one time baseline, i.e., the time baseline is obtained at the very beginning of each process.

Continuing reference to FIG. 2, the performance evaluating module 2 evaluates performance of the VNFs based on the latency-related data.

Specifically, the performance evaluating module 2 may evaluate performance of the VNFs based on the latency-related data in accordance with a predetermined evaluation rule.

For example, based on a numerical range of the timer latency, the performance is evaluated into three levels: "good," "medium," and "poor," whereby the performance of the VNFs is evaluated.

Preferably, the performance monitoring apparatus comprises a performance indication module (not shown).

The performance indication module generates performance indication information of the VNFs based on the latency-related data.

Particularly, the performance indication information may include various kinds of information for indicating performance.

Specifically, the performance indication module may use the latency data per se as the performance indication information. Or, the performance indication module may use performance level information corresponding to the latency data as the performance indication information.

Preferably, the performance monitoring apparatus may send the generated performance indication information of the VNFs to other devices.

According to a preferred embodiment of the present disclosure, when it is needed to add a new VNF to a CPU core, the VNFs that need monitoring include the new VNF and all other VNFs running in the CPU core, and performance monitoring apparatus includes a determining module (not shown).

The determining module determines whether the new VNF may be added to the CPU core based on the latency related information of the new VNF and all other VNFs running in the CPU core.

Specifically, if the latency related information of the new VNF and all other VNFs running in the CPU core all satisfy a predetermined condition, the determining module determines that the new VNF may be added to the CPU core.

For example, the conditions for the performance monitoring apparatus to determine whether a new VNF may be added to a certain CPU core include: timer latencies of the new VNF and all other VNFs running in the CPU core are all smaller than a threshold f1, and there already exist 5 VNFs vnf1~vnf_5 concurrently running on the certain CPU core; now, it is to determine whether a new VNF vnf_6 may be added to the CPU core; then the data obtaining module 1 obtains the respective timer latencies of vnf_1~vnf_6, which are all smaller than the threshold f1; then the determining module determines that the vnf_6 may be added to the CPU core.

The solution according to the present disclosure has the following advantages: capable of satisfying a requirement of monitoring the real-time performance of VNFs by monitoring real-time performance of relevant VNFs; providing a network functions virtualization orchestrator for RAN processing in a cloud system. Besides, the solutions according to the present disclosure may evaluate the real-time performance of the VNFs, which facilitates follow-up decisions based on the evaluated performance, e.g., determining whether a new VNF may be added to a certain CPU core.

Software program of the present disclosure may be executed by a processor to implement the steps or functions above. Likewise, software programs (including relevant data structure) of the present disclosure may be stored in a computer readable recording medium, e.g., an RAM memory, a magnetic or optic driver, or a floppy disk or similar devices. Besides, some steps of functions of the present disclosure may be implemented by hardware, for example, a circuit cooperating with the processor to execute various functions or steps.

Further, a portion of the present disclosure may be applied as a computer program product, for example, a computer program instruction, which, when executed by the computer, may invoke or provide a method and/or technical solution according to the present disclosure through operations of the computer. Further, the program instruction invoking the method of the present disclosure may be stored in a fixed or mobile recording medium, and/or transmitted through broadcast or data flow in other signal bearer media, and/or stored in a working memory of a computer device which operates based on the program instruction. Here, in an embodiment according to the present disclosure, an apparatus comprises a memory for storing a computer program instruction and a processor for executing the program instruction, wherein when the computer program instruction is executed by the processor, the apparatus is triggered to run the methods and/or technical solutions according to multiple embodiments of the present disclosure.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limiting; the scope of the present disclosure is limited by the appended claims, instead of the above depiction. Thus, all variations intended to fall into the meaning and scope of equivalent elements of the claims should be covered within the present disclosure. No reference signs in the claims should be treated as limiting the involved claims. Besides, it is apparent that the term "comprise/comprising/include/including" does not exclude other units or steps, and singularity does not exclude plurality. Multiple units or means stated in the apparatus claims may also be implemented by a single unit or means through software or hardware. Terms such as the first and the second are used to indicate names, but do not indicate any particular sequence.

I claim:

1. A method for monitoring performance of Virtualized Network Functions (VNF) in a virtual machine, the method comprising steps of:
   a. obtaining latency-related data of a VNF that needs performance monitoring, the VNF running on a CPU core supporting concurrent running of multiple VNFs;
   b. evaluating performance of the VNF based on the latency-related data; and
   c. determining whether adding a new VNF to the CPU core running the VNF would decrease the performance of the CPU core running the VNF below a threshold based on the evaluated performance of the VNF,
   wherein the virtual machine is assigned with one or more CPU cores.

2. The method according to claim 1, wherein the VNFs that need monitoring include the new VNF and all other VNFs running in the CPU core, and
   the determining whether adding the new VNF would decrease the performance of the VNFs in the CPU core is based on the latency related information of the new VNF and all other VNFs running in the CPU core.

3. The method according to claim 1, wherein the latency-related data include external interrupt latency, and for each VNF that needs monitoring, the step a comprises steps of:
   starting running the VNF when receiving data from a PCIe device;
   obtaining a first timestamp corresponding to sending of an interrupt signal and a second timestamp corresponding to time instant when the VNF begins working; and
   calculating a corresponding interrupt latency based on the first timestamp and the second timestamp.

4. The method according to claim 1, wherein the latency-related data include timer interrupt latency, and for each VNF that needs monitoring, the step a comprises steps of:
   obtaining a timestamp when a timer event handler begins working; and
   calculating a timestamp when the timer expires based on a time baseline corresponding to an initial time and a predetermined time interval to obtain the corresponding timer latency.

5. The method according to claim 1, wherein the step b comprises:
   generating performance indication information of the VNFs based on the latency-related data.

6. The method according to claim 1, wherein when each VNF that needs performance monitoring corresponds to one process, the latency-related data corresponding to each VNF is obtained in the respective process in step a.

7. The method according to claim 1, wherein multiple VNFs that need performance monitoring correspond to one process, and the latency-related data of the multiple VNFs are obtained in the process corresponding to the multiple VNFs is obtained in step a.

8. A performance monitoring apparatus for monitoring performance of Virtualized Network Functions (VNF) in a virtual machine, the performance monitoring apparatus comprising:
   at least one processor; and
   at least one memory including computer program code,
   the at least one memory and the computer program code configured to, with the at least one processor, cause the performance monitoring apparatus to perform at least
      obtaining latency-related data of a VNF that needs performance monitoring, the VNF running on a CPU core supporting concurrent running of multiple VNFs;
      evaluating performance of the VNF based on the latency-related data; and
      determining whether adding a new VNF to the CPU core running the VNF would decrease performance of the CPU core running the VNF below a threshold based on the evaluated performance of the VNF,
   wherein the virtual machine is assigned with one or more CPU cores.

9. The performance monitoring apparatus according to claim 8, wherein the VNFs that need monitoring include the new VNF and all other VNFs running in the CPU core, and the performance monitoring apparatus is configured for:
   the determining whether the new VNF would decrease the performance of the CPU core below threshold is based on the latency related information of the new VNF and all other VNFs running in the CPU core.

10. The performance monitoring apparatus according to claim 8, wherein the latency-related data include external interrupt latency, and for each VNF that needs monitoring, the performance monitoring apparatus is configured for:
    starting running the VNF when receiving data from a PCIe device;
    obtaining a first timestamp corresponding to sending of an interrupt signal and a second timestamp corresponding to time instant when the VNF begins working; and
    calculating a corresponding interrupt latency based on the first timestamp and the second timestamp.

11. The performance monitoring apparatus according to claim 8, wherein the latency-related data include timer latency, and for each VNF that needs monitoring, the performance monitoring apparatus is configured for:
    obtaining a timestamp when a timer event handler begins working;
    calculating a timestamp when the timer expires based on a time baseline corresponding to an initial time and a predetermined time interval to obtain the corresponding timer latency.

12. The performance monitoring apparatus according to claim 8, wherein the performance monitoring apparatus is configured for:
    generating performance indication information of the VNF based on the latency-related data.

13. The performance monitoring apparatus according to claim 8, wherein when each VNF that needs performance monitoring corresponds to one process, the latency-related data is obtained in the respective process corresponding to each VNF.

14. The performance monitoring apparatus according to claim 8, wherein multiple VNFs that need performance monitoring correspond to one process, and the latency-related data of the multiple VNFs are obtained in the process corresponding to the multiple VNFs.

15. A network functions virtualization orchestrator, wherein the network functions virtualization orchestrator comprises the performance monitoring apparatus according to claim 8.

16. The method according to claim 1, further comprising:
   d. adding the new VNF when adding the new VNF would not decrease the performance below the threshold.

17. The performance monitoring apparatus according to claim 8, wherein the at least one memory and the computer program code are further configured to, with the at least one processor, cause the performance monitoring apparatus to add the new VNF when adding the new VNF would not decrease the performance below the threshold.

\* \* \* \* \*